United States Patent
Glimcher et al.

(10) Patent No.: US 11,842,050 B2
(45) Date of Patent: Dec. 12, 2023

(54) SYSTEM AND METHOD FOR ENABLING SMART NETWORK INTERFACE CARD (SMARTNIC) ACCESS TO LOCAL STORAGE RESOURCES

(71) Applicant: EMC IP Holding Company, LLC, Hopkinton, MA (US)

(72) Inventors: Boris Glimcher, Tel Aviv (IL); Amitai Alkalay, Kadima (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/506,857

(22) Filed: Oct. 21, 2021

(65) Prior Publication Data
US 2023/0127200 A1    Apr. 27, 2023

(51) Int. Cl.
*G06F 3/00* (2006.01)
*G06F 3/06* (2006.01)

(52) U.S. Cl.
CPC .......... *G06F 3/0611* (2013.01); *G06F 3/0604* (2013.01); *G06F 3/067* (2013.01); *G06F 3/0659* (2013.01); *G06F 3/0688* (2013.01)

(58) Field of Classification Search
CPC .... G06F 3/0611; G06F 3/0604; G06F 3/0659; G06F 3/067; G06F 3/0688
See application file for complete search history.

(56) References Cited

U.S. PATENT DOCUMENTS

2020/0226077 A1\* 7/2020 Kang ................. G06F 13/1668
2020/0278893 A1\* 9/2020 Niell .................... G06F 9/5077

\* cited by examiner

*Primary Examiner* — Craig S Goldschmidt
(74) *Attorney, Agent, or Firm* — Brian L. Colandreo; Heath M. Sargeant; Holland & Knight LLP

(57) ABSTRACT

A method, computer program product, and computing system for deploying a storage processor of a storage system as a target of a non-volatile memory express (NVMe) over fabric (NVMe-oF) network. One or more NVMe storage devices coupled to the storage processor may be identified, thus defining one or more local NVMe storage devices. A smart network interface card may be coupled to the NVMe-oF network. The smart network interface card may be provided with access to the one or more local NVMe storage devices via the NVMe-oF network.

20 Claims, 6 Drawing Sheets

SYSTEM AND METHOD FOR ENABLING SMART NETWORK INTERFACE CARD (SMARTNIC) ACCESS TO LOCAL STORAGE RESOURCES

BACKGROUND

Storing and safeguarding electronic content may be beneficial in modern business and elsewhere. Accordingly, various methodologies may be employed to protect and distribute such electronic content.

Conventional network interface cards are unable to access any local storage devices of a host computing device. Even with the introduction of "smart" network interface cards, such smart network interface cards may only utilize traditional network-attached storage which may suffer from significant latency and low bandwidth compared to local storage devices.

SUMMARY OF DISCLOSURE

In one example implementation, a computer-implemented method executed on a computing device may include, but is not limited to, deploying a storage processor of a storage system as a target of a non-volatile memory express (NVMe) over fabric (NVMe-oF) network. One or more NVMe storage devices coupled to the storage processor may be identified, thus defining one or more local NVMe storage devices. A smart network interface card may be coupled to the NVMe-oF network. The smart network interface card may be provided with access to the one or more local NVMe storage devices via the NVMe-oF network.

One or more of the following example features may be included. Providing the smart network interface card with access to the one or more local NVMe storage devices via the NVMe-oF network may include exposing, via the storage processor, the one or more local NVMe storage devices to the NVMe-oF network. Providing the smart network interface card with access to the one or more local NVMe storage devices via the NVMe-oF network may include limiting the exposure of the one or more local NVMe storage devices on the NVMe-oF network to the smart network interface card. Providing the smart network interface card with access to the one or more local NVMe storage devices via the NVMe-oF network may include offloading processing of one or more operations between the smart network card and the one or more local NVMe storage devices from one or more central processing units (CPUs) of the storage processor to a CPU of the smart network interface card. Offloading processing of one or more operations between the smart network card and the one or more local NVMe storage devices from one or more central processing units (CPUs) of the storage processor to a CPU of the smart network interface card may include one or more of: processing NVMe-oF-to-local NVMe command translation via the CPU of the smart network interface card; processing data between the smart network card and the one or more local NVMe storage devices via the CPU of the smart network interface card; and processing doorbell operations on the one or more local NVMe storage devices via the CPU of the smart network interface card. The smart network interface card and the one or more local NVMe storage devices may be configured to be coupled to a peripheral component interface (PCIe) bus of the storage processor. Providing the smart network interface card with access to the one or more local NVMe storage devices via the NVMe-oF network may include providing the smart network interface card with access to the one or more local NVMe storage devices via the NVMe-oF network via peer-to-peer direct media access (DMA) between the smart network interface card and the one or more local NVMe storage devices.

In another example implementation, a computer program product resides on a computer readable medium that has a plurality of instructions stored on it. When executed by a processor, the instructions cause the processor to perform operations that may include, but are not limited to, deploying a storage processor of a storage system as a target of a non-volatile memory express (NVMe) over fabric (NVMe-oF) network. One or more NVMe storage devices coupled to the storage processor may be identified, thus defining one or more local NVMe storage devices. A smart network interface card may be coupled to the NVMe-oF network. The smart network interface card may be provided with access to the one or more local NVMe storage devices via the NVMe-oF network.

One or more of the following example features may be included. Providing the smart network interface card with access to the one or more local NVMe storage devices via the NVMe-oF network may include exposing, via the storage processor, the one or more local NVMe storage devices to the NVMe-oF network. Providing the smart network interface card with access to the one or more local NVMe storage devices via the NVMe-oF network may include limiting the exposure of the one or more local NVMe storage devices on the NVMe-oF network to the smart network interface card. Providing the smart network interface card with access to the one or more local NVMe storage devices via the NVMe-oF network may include offloading processing of one or more operations between the smart network card and the one or more local NVMe storage devices from one or more central processing units (CPUs) of the storage processor to a CPU of the smart network interface card. Offloading processing of one or more operations between the smart network card and the one or more local NVMe storage devices from one or more central processing units (CPUs) of the storage processor to a CPU of the smart network interface card may include one or more of: processing NVMe-oF-to-local NVMe command translation via the CPU of the smart network interface card; processing data between the smart network card and the one or more local NVMe storage devices via the CPU of the smart network interface card; and processing doorbell operations on the one or more local NVMe storage devices via the CPU of the smart network interface card. The smart network interface card and the one or more local NVMe storage devices may be configured to be coupled to a peripheral component interface (PCIe) bus of the storage processor. Providing the smart network interface card with access to the one or more local NVMe storage devices via the NVMe-oF network may include providing the smart network interface card with access to the one or more local NVMe storage devices via the NVMe-oF network via peer-to-peer direct media access (DMA) between the smart network interface card and the one or more local NVMe storage devices.

In another example implementation, a computing system includes at least one processor and at least one memory architecture coupled with the at least one processor, wherein the at least one processor is configured to deploy a storage processor of a storage system as a target of a non-volatile memory express (NVMe) over fabric (NVMe-oF) network. The at least one processor may be further configured to identify one or more NVMe storage devices coupled to the storage processor, thus defining one or more local NVMe storage devices. The at least one processor may be further configured to couple a smart network interface card to the NVMe-oF network. The at least one processor may provide the smart network interface card with access to the one or more local NVMe storage devices via the NVMe-oF network.

One or more of the following example features may be included. Providing the smart network interface card with access to the one or more local NVMe storage devices via the NVMe-oF network may include exposing, via the storage processor, the one or more local NVMe storage devices to the NVMe-oF network. Providing the smart network interface card with access to the one or more local NVMe storage devices via the NVMe-oF network may include limiting the exposure of the one or more local NVMe storage devices on the NVMe-oF network to the smart network interface card. Providing the smart network interface card with access to the one or more local NVMe storage devices via the NVMe-oF network may include offloading processing of one or more operations between the smart network card and the one or more local NVMe storage devices from one or more central processing units (CPUs) of the storage processor to a CPU of the smart network interface card. Offloading processing of one or more operations between the smart network card and the one or more local NVMe storage devices from one or more central processing units (CPUs) of the storage processor to a CPU of the smart network interface card may include one or more of: processing NVMe-oF-to-local NVMe command translation via the CPU of the smart network interface card; processing data between the smart network card and the one or more local NVMe storage devices via the CPU of the smart network interface card; and processing doorbell operations on the one or more local NVMe storage devices via the CPU of the smart network interface card. The smart network interface card and the one or more local NVMe storage devices may be configured to be coupled to a peripheral component interface (PCIe) bus of the storage processor. Providing the smart network interface card with access to the one or more local NVMe storage devices via the NVMe-oF network may include providing the smart network interface card with access to the one or more local NVMe storage devices via the NVMe-oF network via peer-to-peer direct media access (DMA) between the smart network interface card and the one or more local NVMe storage devices.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
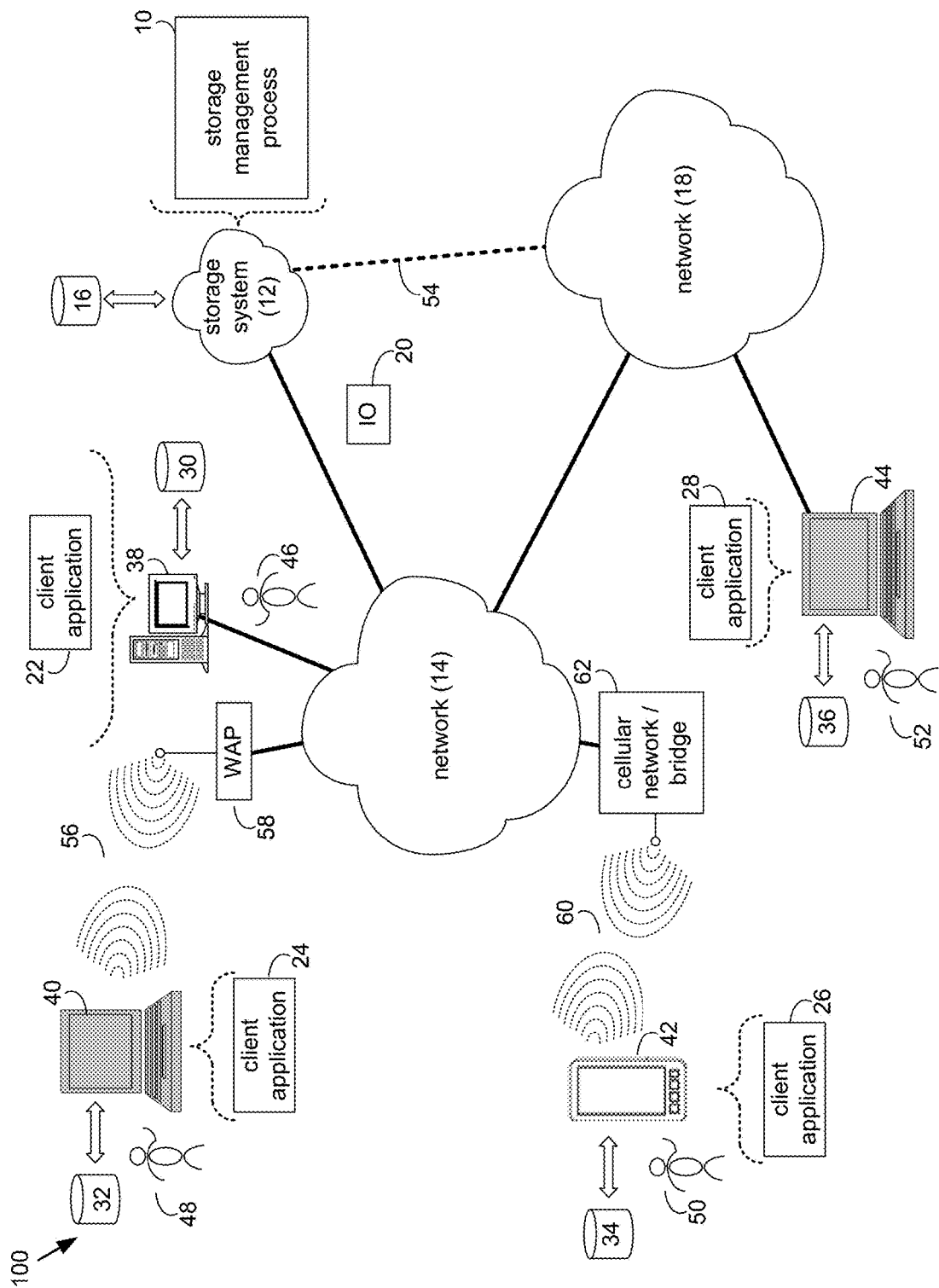
FIG. 1 is an example diagrammatic view of a storage system and a multi-node communication process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of multi-node communication process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a multi-node communication process, such as storage management process 10 of FIG. 1, may include but is not limited to, deploying a storage processor of a storage system as a target of a non-volatile memory express (NVMe) over fabric (NVMe-oF) network. One or more NVMe storage devices coupled to the storage processor may be identified, thus defining one or more local NVMe storage devices. A smart network interface card may be coupled to the NVMe-oF network. The smart network interface card may be provided with access to the one or more local NVMe storage devices via the NVMe-oF network.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
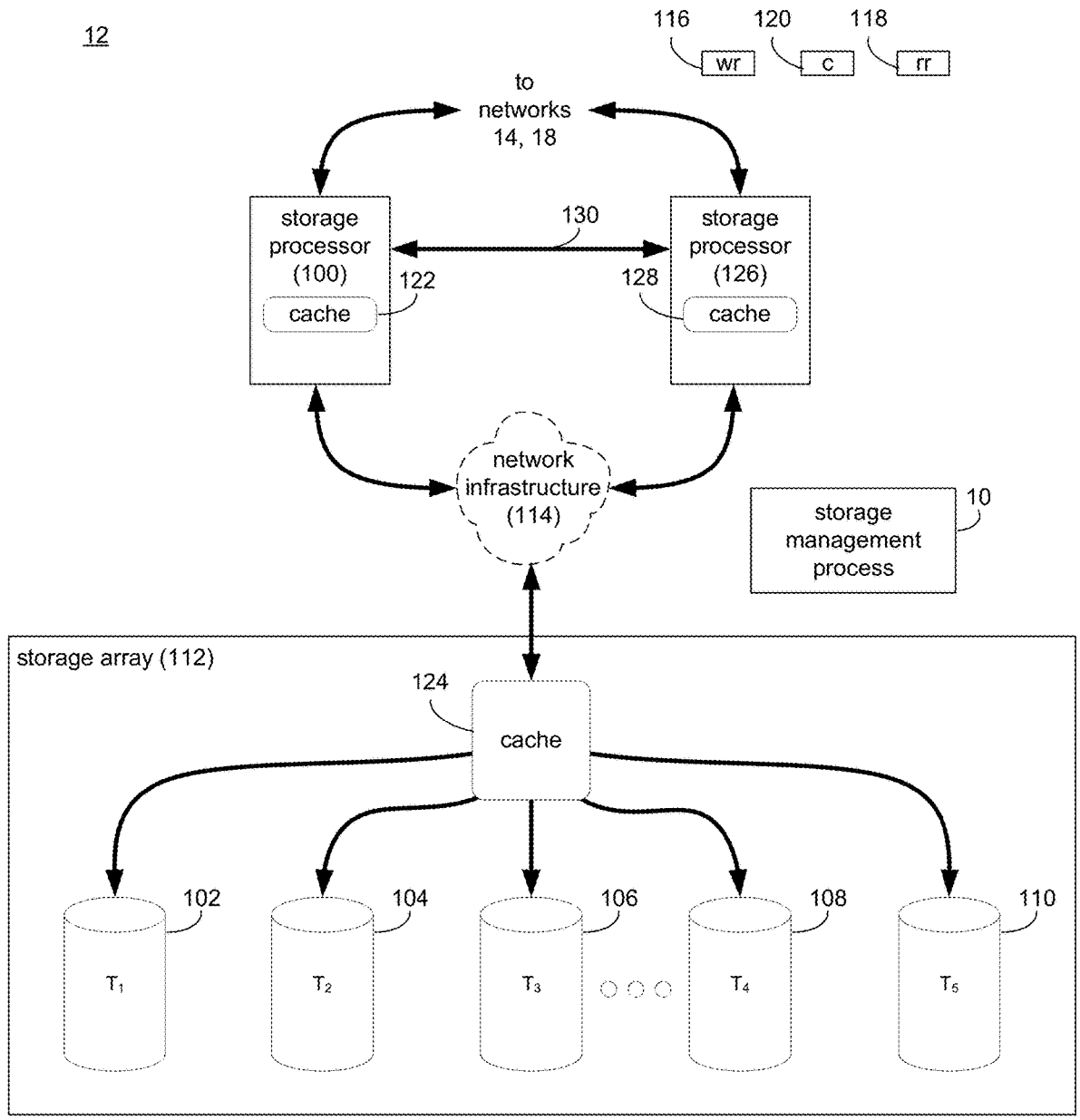
FIG. 2 is an example diagrammatic view of a storage system of FIG. 1 according to one or more example implementations of the disclosure.
Figure 3:
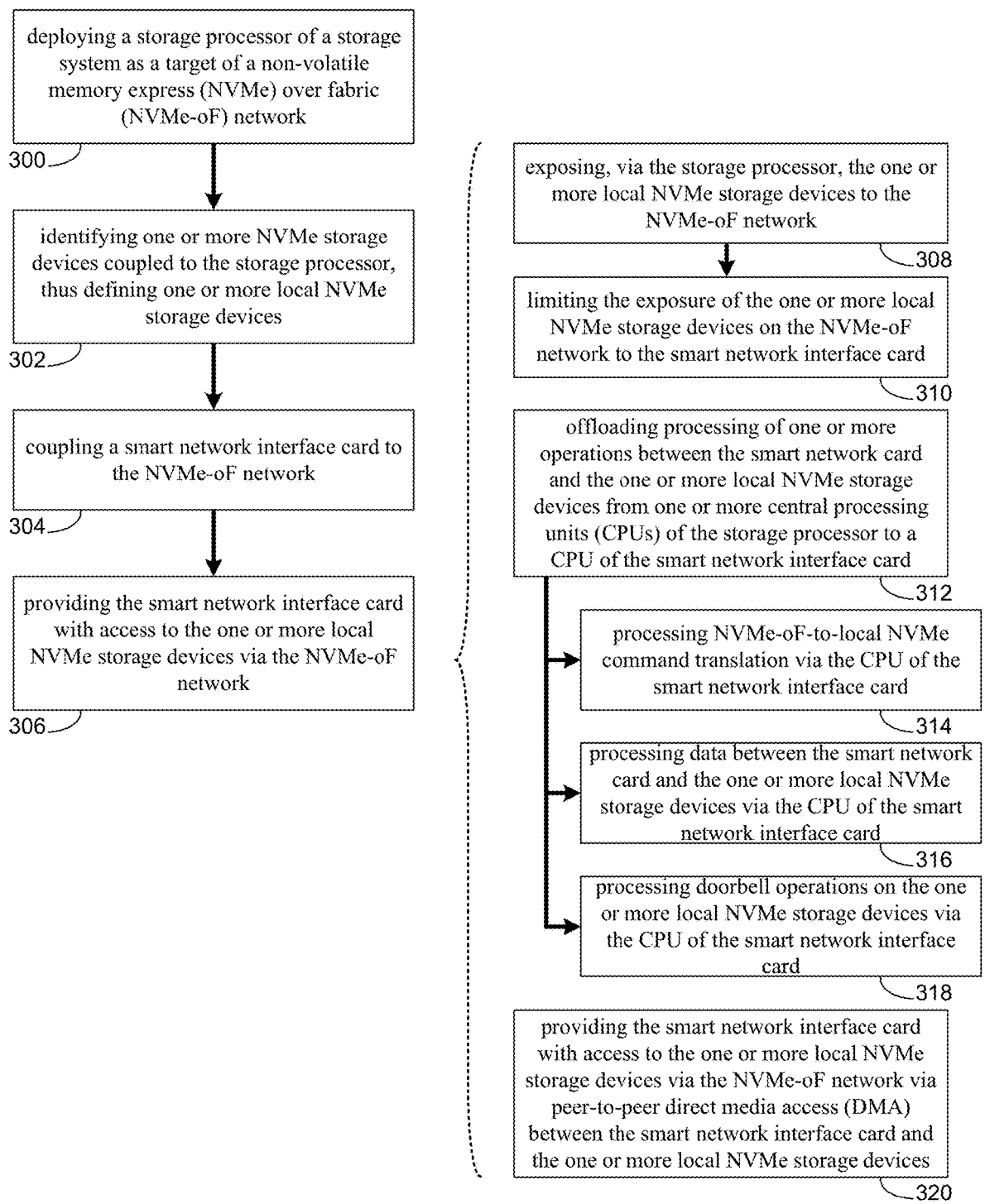
FIG. 3 is an example flowchart of the multi-node communication process of FIG. 1 according to one or more example implementations of the disclosure.
Figure 4:
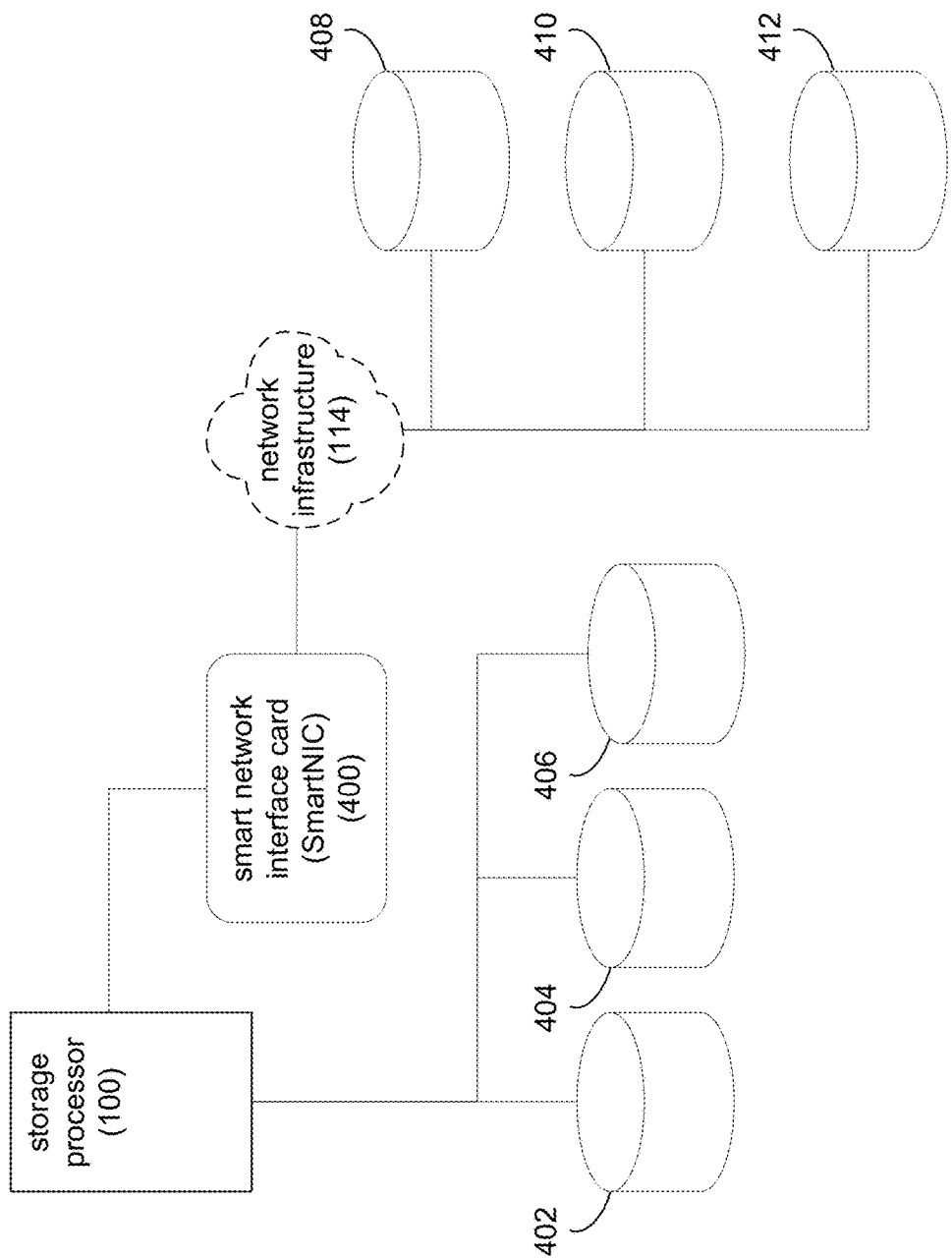
FIGS. 4-6 are example diagrammatic views of a multi-node communication process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of multi-node communication process 10. The instruction sets and subroutines of multi-node communication process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of multi-node communication process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

The Storage Management Process:

Referring also to FIGS. 3-6 and in some implementations, storage management process 10 may deploy 300 a storage processor of a storage system as a target of a non-volatile memory express (NVMe) over fabric (NVMe-oF) network. One or more NVMe storage devices coupled to the storage processor may be identified 302, thus defining one or more local NVMe storage devices. A smart network interface card may be coupled 304 to the NVMe-oF network. The smart network interface card may be provided 306 with access to the one or more local NVMe storage devices via the NVMe-oF network.

In some implementations, storage management process 10 may allow for expansion of the storage capacity of smart network interface cards (SmartNICs) by utilizing the storage space of local storage devices coupled to the host computing device of the SmartNIC. For example and referring also to FIG. 4, conventional SmartNICs (e.g., SmartNIC 400) are unable to access any local storage devices (e.g., local storage devices 402, 404, 406) of the host computing device (e.g., storage processor 100). In other words, conventional SmartNICs (e.g., SmartNIC 400) have no access to any local storage devices (e.g., local storage devices 402, 404, 406) of the host computing device (e.g., storage processor 100) and only the host computing device (e.g., storage processor 100) can access the local storage devices (e.g., local storage devices 402, 404, 406). Rather, the SmartNIC (e.g., SmartNIC 400) may only utilize traditional network-attached storage (e.g., network-attached storage devices 408, 410, 412). As will be discussed in greater detail below, local storage devices may provide less latency and greater bandwidth than the network-attached storage.

In some implementations, storage management process 10 may deploy 300 a storage processor of a storage system as a target of a non-volatile memory express (NVMe) over fabric (NVMe-oF) network. As discussed above and referring again to FIG. 3, a storage processor (e.g., storage processor 100) may be configured to process data between one or more client electronic devices (e.g., client electronic device 38) and a data array (e.g., data array 112). In some implementations, data may be conveyed between the one or more client electronic devices, the data array, and/or other storage devices (e.g., network-attached storage devices 408, 410, 412). Storage management process 10 may utilize various storage protocols (e.g., Small Computer System Interface (SCSI), Fibre Channel, Non-Volatile Memory Express (NVMe) over Fabric (NVMe-oF), etc.) for accessing different storage resources (e.g., volumes, volume groups, files, file systems, etc.) of a storage system. As is known in the art, NVMe or NVM Express® is a specification defining how host software communicates with non-volatile memory across a PCI Express® (PCIe®) bus. A storage protocol may generally include standards or protocols for physically connecting and transferring data between computing devices and peripheral devices. In some implementations, a storage protocol path may generally include a hardware and/or software communication link between computing devices and peripheral devices.

A storage processor (e.g., storage processor 100) may be configured to communicate with one or more local storage devices (e.g., local storage devices 402, 404, 406) using various storage protocols. In one example, storage management process 10 may utilize NVMe-oF as a storage protocol for accessing data within one or more NVMe storage devices (e.g., local storage devices 402, 404, 406). As described above, the NVMe storage protocol defines how host software communicates with non-volatile memory across a PCI Express® (PCIe®) bus. In this example, the one or more local NVMe storage devices (e.g., local storage devices 402, 404, 406) may be coupled to the storage processor (e.g., storage processor 100) via a PCIe bus of the storage processor. As shown in this example with a conventional deployment or configuration of an NVMe-oF network, the storage processor (e.g., storage processor 100) may be configured as a host with the one or more local NVMe storage devices configured as target of the NVMe-oF network. In this manner, the "host" (e.g., storage processor 100) may control the access to the one or more "targets" (e.g., local storage devices 402, 404, 406) within the NVMe-oF network.

Figure 5:
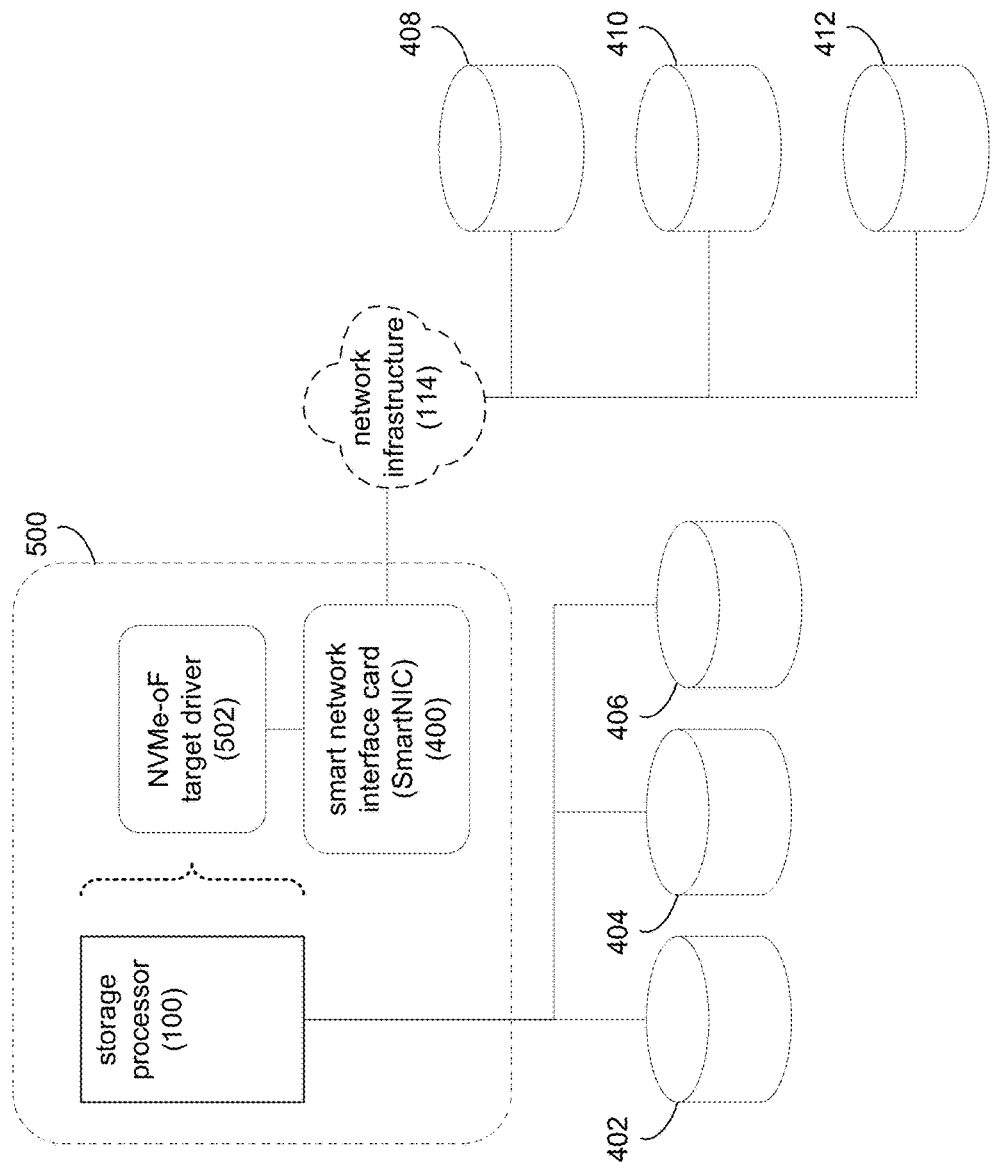
Figure 6:
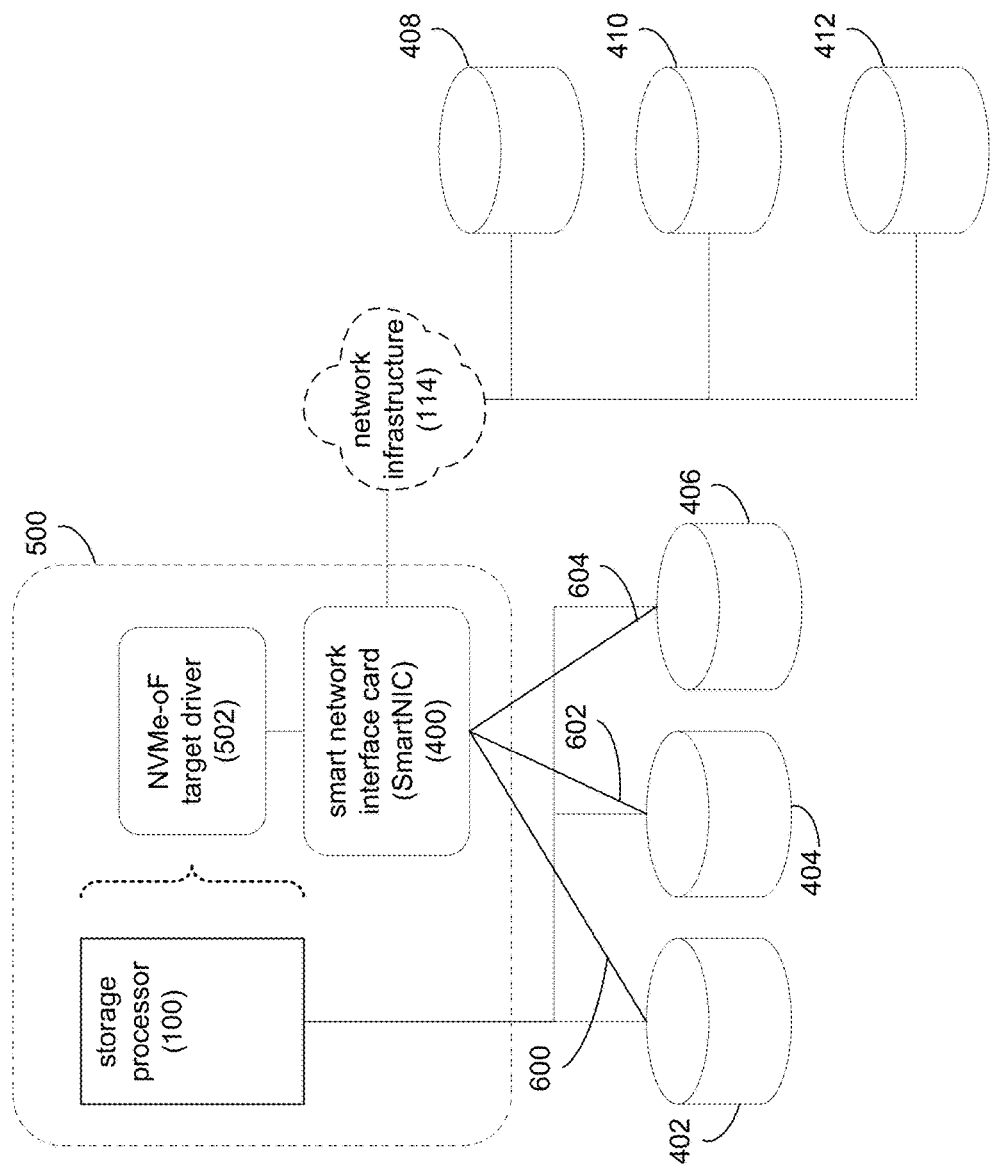

Storage management process 10 may deploy 300 a storage processor of a storage system as a target of a non-volatile memory express (NVMe) over fabric (NVMe-oF) network. For example, in addition to the "host" role the storage processor is configured to perform, storage management process 10 may deploy 300 the storage processor (e.g., storage processor 100) as a target of an NVMe-oF network. Referring also to FIG. 5, storage management process 10 may deploy 300 storage processor 100 as a target within an NVMe-oF network (e.g., NVMe-oF network 500). For example, storage management process 10 may run or execute an NVMe-oF target driver (e.g., NVMe-oF target driver 502) on the storage processor (e.g., storage processor 100). As will be discussed in greater detail below, storage management process 10 may define a smart network interface card (e.g., SmartNIC) as the "host" of the NVMe-oF network (e.g., NVMe-oF network 500). In this manner, the SmartNIC (e.g., SmartNIC 400) may be provided with access to the one or more local NVMe drives (e.g., local storage devices 402, 404, 406).

In some implementations, storage management process 10 may identify 302 one or more NVMe storage devices coupled to the storage processor, thus defining one or more local NVMe storage devices. For example, the storage processor (e.g., storage processor 100) may be coupled to one or more storage devices (e.g., local storage devices 402, 404, 406). As discussed above, storage management process 10 may deploy 300 an NVMe-oF network (e.g., NVMe-oF network 500) and the one or more local storage devices (e.g., local storage devices 402, 404, 406) may be NVMe storage devices. In response to deploying 300 the storage processor (e.g., storage processor 100) as a target of the NVMe-oF network (e.g., NVMe-oF network 500), storage management process 10 may identify 302 any storage devices of storage processor (e.g., storage processor 100). Accordingly, storage management process 10 may identify 302 one or more local NVMe storage devices (e.g., local storage devices 402, 404, 406). It will be appreciated that storage management process 10 may identify 302 one or more local storage devices at any time and/or continuously during the operation of the storage system within the scope of the present disclosure.

In some implementations, storage management process 10 may couple 304 a smart network interface card to the NVMe-oF network. A smart network interface card or SmartNIC is a dedicated piece of hardware that can be used to accelerate networking, storage, and security functions. Also, they can perform virtualization, load balancing, and data path optimization. SmartNICs are typically made from a network interface controller, a multi-core CPU, with the option to add an FPGA and/or GPU. SmartNICs may be equipped with computing power, allowing them to offload networking functions, security functions, and storage functions from a host server to the SmartNIC, freeing up valuable processing power. Freeing up processing power may allow a storage processor or host server to focus on running enterprise applications and the operating system more efficiently. Furthermore, network virtualization protocols may be offloaded to the SmartNIC. Protocols that can be offloaded include VXLAN, NVGRE, Geneve protocols, and many more. Also, SmartNICs may be capable of performing packet inspection, flow table processing, encryption, VXLAN overlays, and NVMe-oF.

Referring again to FIG. 5, storage management process 10 may couple 304 a smart network interface card (e.g., SmartNIC 400) to the NVMe-oF network (e.g., NVMe-oF network 500). As discussed above, the smart network interface card (e.g., SmartNIC 400) may be configured as a "host" of the NVMe-oF network (e.g., NVMe-oF network 500) and the storage processor (e.g., storage processor 100) may be configured as a "target" of the NVMe-oF network (e.g., NVMe-oF network 500). For example, the smart network interface card (e.g., SmartNIC 400) may be configured to communicate with the storage processor (e.g., storage processor 100) using the NVMe-oF target driver (e.g., NVMe-oF target driver 502).

In some implementations, storage management process 10 may provide 306 the smart network interface card with access to the one or more local NVMe storage devices via the NVMe-oF network. For example and as discussed above, in a conventional NVMe-oF network configuration, a smart network interface card (SmartNIC) may be unable to access any local storage devices of a "host" of the NVMe-oF network. By deploying 300 the storage processor (e.g., storage processor 100) as a target (e.g., by utilizing NVMe-oF target driver 502) of the NVMe-oF network (e.g., NVMe-oF network 500), storage management process 10 may provide 306 access to one or more local storage devices (e.g., local storage devices 402, 404, 406) of the storage processor (e.g., storage processor 100). In some implementations, storage management process 10 may connect the SmartNIC (e.g., SmartNIC 400) to the storage processor (e.g., storage processor 100) to the one or more local NVMe storage devices (e.g., local storage devices 402, 404, 406) as if they were local storage devices of the SmartNIC (e.g., SmartNIC 400) itself.

In some implementations, storage management process 10 may utilize a CPU of the SmartNIC (e.g., SmartNIC 400) that has one or more network devices configured for communication with the storage processor (e.g., storage processor 100) and one or more network devices configured for communication with one or more network storage devices (e.g., network-attached storage devices 408, 410, 412). Accordingly, storage management process 10 may, using the SmartNIC (e.g., SmartNIC 400), configure separate NVMe-oF networks and run different data traffic between the storage processor (e.g., storage processor 100) and the one or more network-attached storage devices (e.g., network-attached storage devices 408, 410, 412); the storage processor (e.g., storage processor 100) and the SmartNIC (e.g., SmartNIC 400); and the SmartNIC (e.g., SmartNIC 400) and the one or more network-attached storage devices (e.g., network-attached storage devices 408, 410, 412). As discussed above, the configuration or deployment of NVMe-oF network 500 may be in addition to any other NVMe-oF network or other storage protocol configuration within storage system 12.

Providing 306 the smart network interface card with access to the one or more local NVMe storage devices via the NVMe-oF network may include exposing 308, via the storage processor, the one or more local NVMe storage devices to the NVMe-oF network. For example, storage management process 10 may allow for the selective exposure of particular storage devices of a target of an NVMe-oF network. Referring again to FIG. 5 and in response to deploying 300 the storage processor (e.g., storage processor 100) as a target of the NVMe-oF network (e.g., NVMe-oF network 500), identifying 302 one or more local storage devices (e.g., local storage devices 402, 404, 406), and coupling 304 the smart network interface card (e.g., SmartNIC 400) to the NVMe-oF network (e.g., NVMe-oF network 500), storage management process 10 may expose 308 the one or more local NVMe storage devices (e.g., local storage devices 402, 404, 406) to the NVMe-oF network (e.g., NVMe-oF network 500). In this manner, storage management process 10 may provide 306 the SmartNIC (e.g., SmartNIC 400) with access to the exposed one or more local NVMe storage devices (e.g., local storage devices 402, 404, 406).

Providing 306 the smart network interface card with access to the one or more local NVMe storage devices via the NVMe-oF network may include limiting 310 the exposure of the one or more local NVMe storage devices on the NVMe-oF network to the smart network interface card. For example, storage management process 10 may allow a user (e.g., user 46 on client electronic device 38) to select (e.g., via a user interface) which local NVMe storage devices of the one or more local NVMe storage devices to expose 308 on the NVMe-oF network. In this manner, storage management process 10 may allow a user to determine which, if any, of the one or more local NVMe storage devices (e.g., local storage devices 402, 404, 406) to expose 308 to access by the SmartNIC (e.g., SmartNIC 400). Storage management process 10 may, via the storage processor (e.g., storage processor 100) limit 310 the exposure to the SmartNIC (e.g., SmartNIC 400) to prevent unwanted or unauthorized access to the local storage devices (e.g., local storage devices 402, 404, 406) by other network devices.

Providing 306 the smart network interface card with access to the one or more local NVMe storage devices via the NVMe-oF network may include offloading 312 processing of one or more operations between the smart network card and the one or more local NVMe storage devices from one or more central processing units (CPUs) of the storage processor to a CPU of the smart network interface card. For example and as discussed above, the SmartNIC (e.g., SmartNIC 400) may include one or more CPUs. Storage management process 10 may utilize the one or more CPUs of the SmartNIC (e.g., SmartNIC 400) to offload various operations between with the SmartNIC (e.g., SmartNIC 400) and the one or more local NVMe storage devices (e.g., local storage devices 402, 404, 406) from the one or more CPUs of the storage processor (e.g., storage processor 100). Accordingly, storage management process 10 may reduce the computational load of processing operations between the SmartNIC (e.g., SmartNIC 400) and the one or more local NVMe storage devices (e.g., local storage devices 402, 404, 406) on the one or more CPUs of the storage processor (e.g., storage processor 100).

Offloading 312 processing of one or more operations between the smart network card and the one or more local NVMe storage devices from one or more central processing units (CPUs) of the storage processor to a CPU of the smart network interface card may include one or more of processing 314 NVMe-oF-to-local NVMe command translation via the CPU of the smart network interface card; processing 316 data between the smart network card and the one or more local NVMe storage devices via the CPU of the smart network interface card; and processing 318 doorbell operations on the one or more local NVMe storage devices via the CPU of the smart network interface card. For example, storage management process 10 may offload the processing of NVMe-oF-to-local NVMe command translation (i.e., the translation of commands from NVMe-oF to local NVMe storage devices and/or from local NVMe storage devices to NVMe-oF) from the one or more CPUs of the storage processor (e.g., storage processor 100) to the CPU of the SmartNIC (e.g., SmartNIC 400).

In another example, storage management process 10 may offload the processing of data between the smart network card and the one or more local NVMe storage devices via the CPU of the smart network interface card. For example, as opposed to relying on the one or more CPUs of the storage processor (e.g., storage processor 100), storage management process 10 may offload the processing of data between the SmartNIC (e.g., SmartNIC 400) and the one or more local NVMe storage devices (e.g., local storage devices 402, 404, 406). In this manner, the one or more CPUs of the SmartNIC (e.g., SmartNIC 400) may process 316 data between the SmartNIC (e.g., SmartNIC 400) and the one or more local NVMe storage devices (e.g., local storage devices 402, 404, 406).

In another example, storage management process 10 may offload the processing of doorbell operations on the one or more local NVMe storage devices via the CPU of the smart network interface card. As is known in the art, a doorbell operation may include an indication that an IO request is ready for processing by one or more NVMe storage devices and/or an indication that an IO request has been processed by the one or more NVMe storage devices. Accordingly, storage management process 10 may offload the processing of doorbell operations on the one or more local NVMe storage devices (e.g., local storage devices 402, 404, 406) from the one or more CPUs of the storage processor (e.g., storage processor 100) to the one or more CPUs of the SmartNIC (e.g., SmartNIC 400). In some implementations, storage management process 10 may offload the processing of interrupts in a similar manner as the doorbell operation as described above.

In some implementations, the smart network interface card and the one or more local NVMe storage devices may be configured to be coupled to a peripheral component interface (PCIe) bus of the storage processor. For example and as discussed above, the SmartNIC (e.g., SmartNIC 400) and the one or more local NVMe storage devices (e.g., local storage devices 402, 404, 406) may be coupled to a PCIe bus of the storage processor (e.g., storage processor 100).

Providing 306 the smart network interface card with access to the one or more local NVMe storage devices via the NVMe-oF network may include providing 320 the smart network interface card with access to the one or more local NVMe storage devices via the NVMe-oF network via peer-to-peer direct media access (DMA) between the smart network interface card and the one or more local NVMe storage devices. Peer-to-peer DMA may generally include transmitting data directly from one device to another without going through the systems' memory or CPU. For example and as discussed above, when the one or more local NVMe storage devices (e.g., local storage devices 402, 404, 406) and the SmartNIC (e.g., SmartNIC 400) are coupled 302 to the PCIe bus of the storage processor (e.g., storage processor 100), storage management process 10 may utilize peer-to-peer direct media access (DMA) to transfer data between the one or more local NVMe storage devices (e.g., local storage devices 402, 404, 406) and the SmartNIC (e.g., SmartNIC 400) (e.g., shown in FIG. 6 as links 600, 602, 604 between SmartNIC 400 and local storage devices 402, 404, 406, respectively). In this manner, storage management process 10 may transmit data between the one or more local NVMe storage devices (e.g., local storage devices 402, 404, 406) and the SmartNIC (e.g., SmartNIC 400) without utilizing the one or more CPUs and/or memory of the storage processor (e.g., storage processor 100).

Accordingly, storage management process 10 may allow a SmartNIC (e.g., SmartNIC 400) to utilize one or more local NVMe storage devices of a storage processor to achieve data processing with less latency and greater bandwidth available from network-attached storage (e.g., network-attached storage devices 408, 410, 412). For example, storage management process 10 may allow data generated by the SmartNIC (e.g., SmartNIC 400) to be stored and accessed more efficiently than with network-attached storage (e.g., network-attached storage devices 408, 410, 412).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
deploying a storage processor of a host computing device of a storage system as a target of a plurality of non-volatile memory express (NVMe) over fabric (NVMe-oF) networks, including executing, by the storage processor, an NVMe-oF target driver, wherein the storage processor is configured to process data between one or more client electronic devices and a data array;
identifying one or more NVMe storage devices coupled to the storage processor via a PCIe bus of the storage processor, thus defining one or more local NVMe storage devices of the storage processor and forming at least a portion of the data array;

coupling a smart network interface card to the plurality of NVMe-oF networks, the smart network interface card being separate from the storage processor of the host computing device;

providing the smart network interface card with access to the one or more local NVMe storage devices via the plurality of NVMe-oF networks; and configuring the plurality of NVMe-oF networks as separate networks for different traffic between:
- the storage processor and one or more network-attached storage devices,
- the storage processor and the smart network interface card, and
- the smart network interface card and the one or more network attached storage devices.

2. The computer-implemented method of claim 1, wherein providing the smart network interface card with access to the one or more local NVMe storage devices via the plurality NVMe-oF networks includes:
exposing, via the storage processor, the one or more local NVMe storage devices to the plurality of NVMe-oF networks.

3. The computer-implemented method of claim 2, wherein providing the smart network interface card with access to the one or more local NVMe storage devices via the plurality of NVMe-oF networks includes:
limiting the exposure of the one or more local NVMe storage devices on the plurality of NVMe-oF networks to the smart network interface card.

4. The computer-implemented method of claim 1, wherein providing the smart network interface card with access to the one or more local NVMe storage devices via the plurality of NVMe-oF networks includes:
offloading processing of one or more operations between the smart network card and the one or more local NVMe storage devices from one or more central processing units (CPUs) of the storage processor to a CPU of the smart network interface card.

5. The computer-implemented method of claim 4, wherein offloading processing of one or more operations between the smart network card and the one or more local NVMe storage devices from one or more central processing units (CPUs) of the storage processor to a CPU of the smart network interface card includes one or more of:
processing NVMe-oF-to-local NVMe command translation via the CPU of the smart network interface card;
processing data between the smart network card and the one or more local NVMe storage devices via the CPU of the smart network interface card; and
processing doorbell operations on the one or more local NVMe storage devices via the CPU of the smart network interface card.

6. The computer-implemented method of claim 1, wherein the smart network interface card and the one or more local NVMe storage devices are configured to be coupled to a peripheral component interface (PCIe) bus of the storage processor.

7. The computer-implemented method of claim 6, wherein providing the smart network interface card with access to the one or more local NVMe storage devices via the plurality of NVMe-oF networks includes:
providing the smart network interface card with access to the one or more local NVMe storage devices via the plurality of NVMe-oF networks via peer-to-peer direct media access (DMA) between the smart network interface card and the one or more local NVMe storage devices.

8. A computer program product residing on a non-transitory computer readable medium having a plurality of instructions stored thereon which, when executed by a processor, cause the processor to perform operations comprising:
deploying a storage processor of a host computing device of a storage system as a target of a plurality of non-volatile memory express (NVMe) over fabric (NVMe-oF) networks, including executing, by the storage processor, an NVMe-oF target driver, wherein the storage processor is configured to process data between one or more client electronic devices and a data array;

identifying one or more NVMe storage devices coupled to the storage processor via a PCIe bus of the storage processor, thus defining one or more local NVMe storage devices of the storage processor and forming at least a portion of the data array;

coupling a smart network interface card to the plurality of NVMe-oF networks, the smart network interface card being separate from the storage processor of the host computing device;

providing the smart network interface card with access to the one or more local NVMe storage devices via the plurality of NVMe-oF networks; and configuring the plurality of NVMe-oF networks as separate networks for different traffic between:
- the storage processor and one or more network-attached storage devices,
- the storage processor and the smart network interface card, and
- the smart network interface card and the one or more network attached storage devices.

9. The computer program product of claim 8, wherein providing the smart network interface card with access to the one or more local NVMe storage devices via the plurality of NVMe-oF networks includes:
exposing, via the storage processor, the one or more local NVMe storage devices to the plurality of NVMe-oF networks.

10. The computer program product of claim 9, wherein providing the smart network interface card with access to the one or more local NVMe storage devices via the plurality NVMe-oF networks includes:
limiting the exposure of the one or more local NVMe storage devices on the plurality of NVMe-oF networks to the smart network interface card.

11. The computer program product of claim 8, wherein providing the smart network interface card with access to the one or more local NVMe storage devices via the plurality of NVMe-oF networks includes offloading processing of one or more operations between the smart network card and the one or more local NVMe storage devices from one or more central processing units (CPUs) of the storage processor to a CPU of the smart network interface card.

12. The computer program product of claim 11, wherein offloading processing of one or more operations between the smart network card and the one or more local NVMe storage devices from one or more central processing units (CPUs) of the storage processor to a CPU of the smart network interface card includes one or more of:
processing NVMe-oF-to-local NVMe command translation via the CPU of the smart network interface card;

processing data between the smart network card and the one or more local NVMe storage devices via the CPU of the smart network interface card; and processing doorbell operations on the one or more local NVMe storage devices via the CPU of the smart network interface card.

13. The computer program product of claim 8, wherein the smart network interface card and the one or more local NVMe storage devices are configured to be coupled to a peripheral component interface (PCIe) bus of the storage processor.

14. The computer program product of claim 13, wherein providing the smart network interface card with access to the one or more local NVMe storage devices via the plurality of NVMe-oF networks includes:

providing the smart network interface card with access to the one or more local NVMe storage devices via the plurality of NVMe-oF networks via peer-to-peer direct media access (DMA) between the smart network interface card and the one or more local NVMe storage devices.

15. A computing system comprising:

a memory; and a processor configured to deploy a storage processor of a host computing device of a storage system as a target of a plurality of non-volatile memory express (NVMe) over fabric (NVMe-oF) networks, including executing, by the storage processor, an NVMe-oF target driver, wherein the storage processor is configured to process data between one or more client electronic devices and a data array, wherein the processor is further configured to identify one or more NVMe storage devices coupled to the storage processor via a PCIe bus of the storage processor, thus defining one or more local NVMe storage devices of the storage processor and forming at least a portion of the data array, wherein the processor is further configured to couple a smart network interface card to the plurality of NVMe-oF networks, the smart network interface card being separate from the storage processor of the host computing device, and wherein the processor is further configured to provide the smart network interface card with access to the one or more local NVMe storage devices via the plurality of NVMe-oF networks; and the plurality of NVMe-oF networks being configured as separate networks for different traffic between: the storage processor and one or more network-attached storage devices; the storage processor and the smart network interface card, and the smart network interface card and the one or more network attached storage devices.

16. The computing system of claim 15, wherein providing the smart network interface card with access to the one or more local NVMe storage devices via the plurality of NVMe-oF networks includes:

exposing, via the storage processor, the one or more local NVMe storage devices to the plurality of NVMe-oF networks.

17. The computing system of claim 15, wherein providing the smart network interface card with access to the one or more local NVMe storage devices via the plurality of NVMe-oF networks includes:

limiting the exposure of the one or more local NVMe storage devices on the plurality of NVMe-oF networks to the smart network interface card.

18. The computing system of claim 15, wherein providing the smart network interface card with access to the one or more local NVMe storage devices via the plurality of NVMe-oF networks includes offloading processing of one or more operations between the smart network card and the one or more local NVMe storage devices from one or more central processing units (CPUs) of the storage processor to a CPU of the smart network interface card.

19. The computing system of claim 18, wherein offloading processing of one or more operations between the smart network card and the one or more local NVMe storage devices from one or more central processing units (CPUs) of the storage processor to a CPU of the smart network interface card includes one or more of:

processing NVMe-oF-to-local NVMe command translation via the CPU of the smart network interface card;

processing data between the smart network card and the one or more local NVMe storage devices via the CPU of the smart network interface card; and processing doorbell operations on the one or more local NVMe storage devices via the CPU of the smart network interface card.

20. The computing system of claim 15, wherein the smart network interface card and the one or more local NVMe storage devices are configured to be coupled to a peripheral component interface (PCIe) bus of the storage processor.

* * * * *